Figure 1:
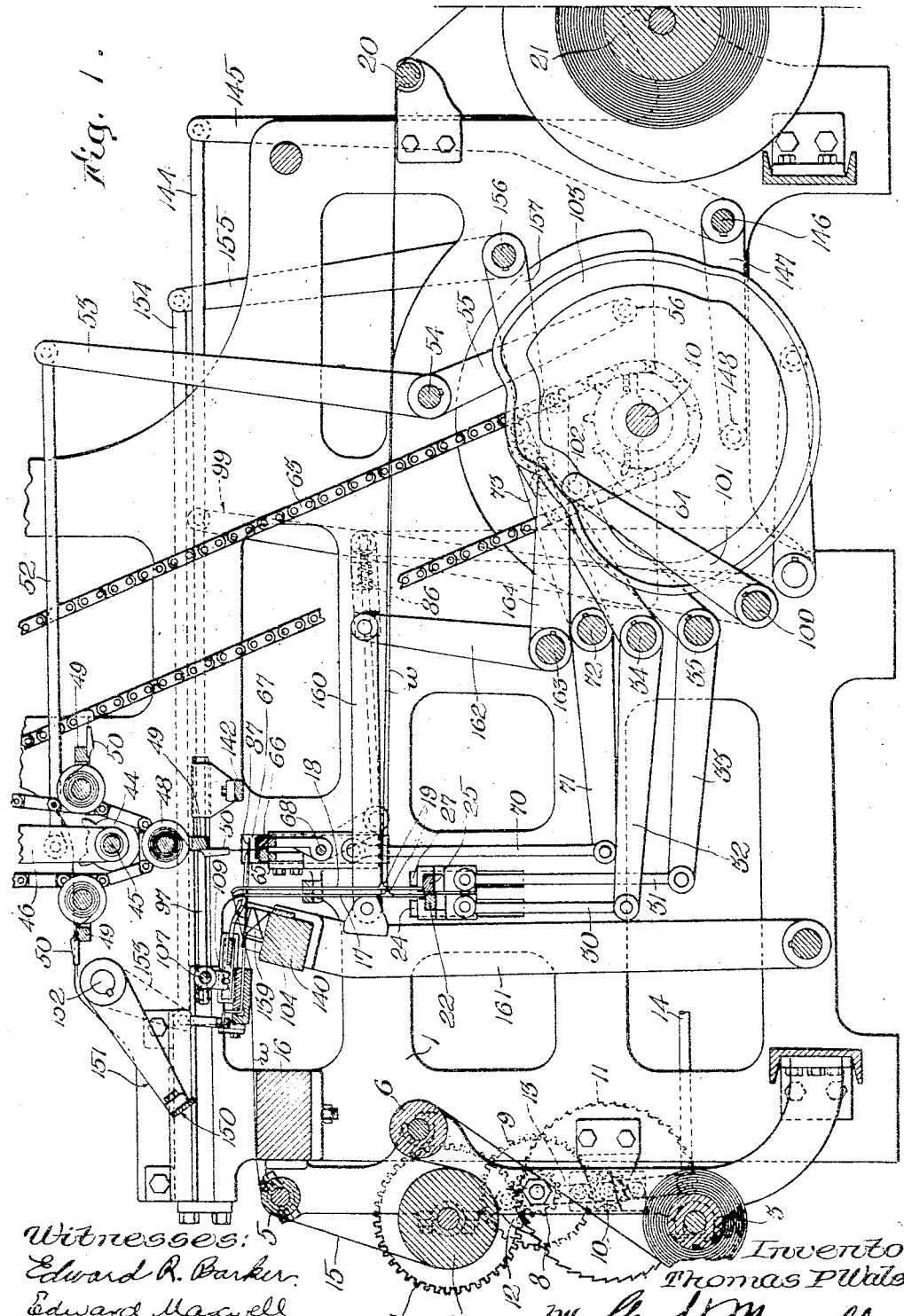

T. P. WALSH.
LOOM FOR WEAVING ORIENTAL RUGS.
APPLICATION FILED APR. 3, 1911.

1,117,115.

Patented Nov. 10, 1914.
11 SHEETS—SHEET 1.

T. P. WALSH.
LOOM FOR WEAVING ORIENTAL RUGS.
APPLICATION FILED APR. 3, 1911.

1,117,115.

Patented Nov. 10, 1914.
11 SHEETS—SHEET 2.

Witnesses:
Edward R. Barker.
Edward Maxwell

Inventor:
Thomas P. Walsh,
by Geo. H. Maxwell
Attorney.

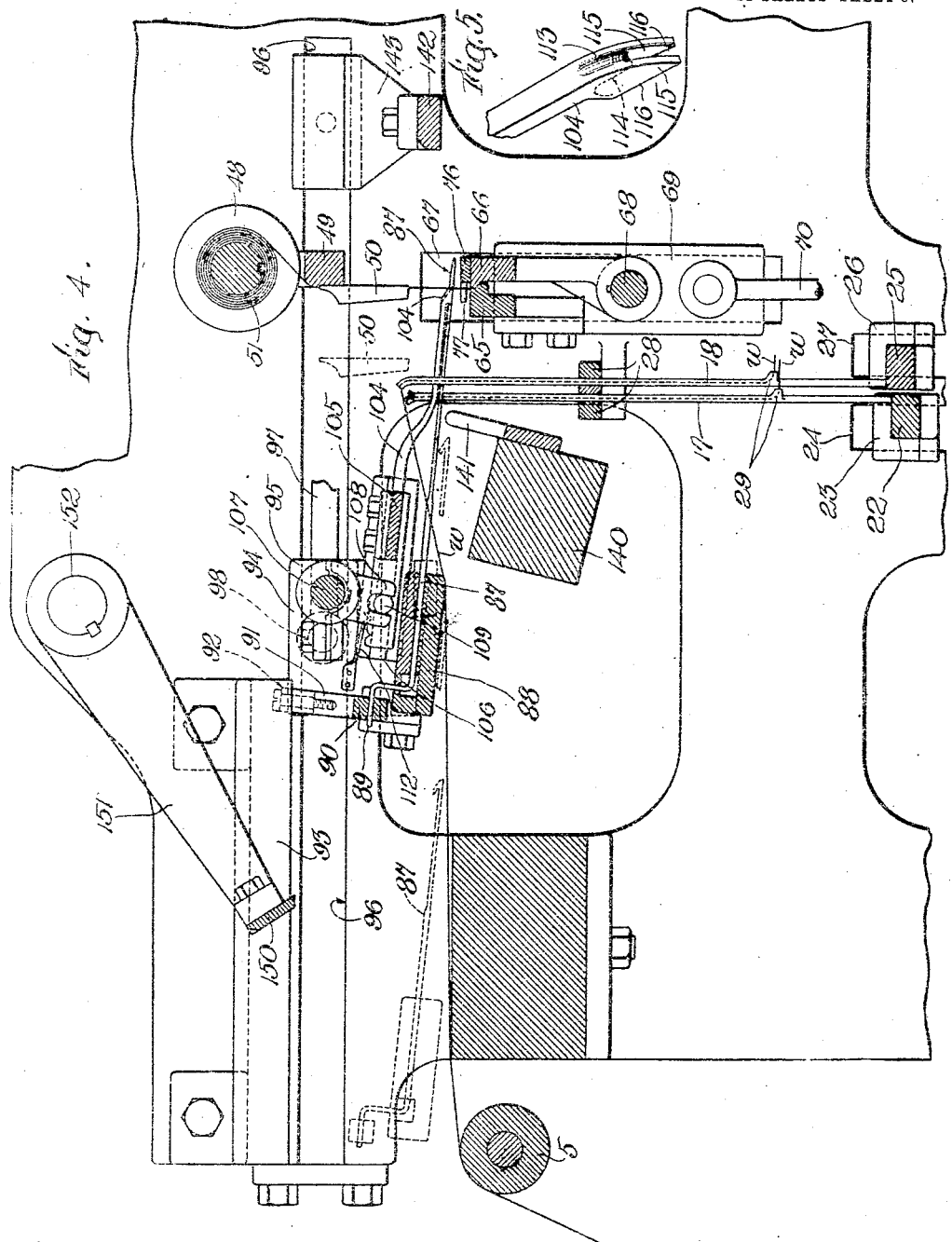

T. P. WALSH.
LOOM FOR WEAVING ORIENTAL RUGS.
APPLICATION FILED APR. 3, 1911.

1,117,115.

Patented Nov. 10, 1914.
11 SHEETS—SHEET 4.

Witnesses:
Edward R. Barker.
Edward Maxwell.

Inventor:
Thomas P. Walsh,
by Geo. H. Maxwell,
Attorney.

T. P. WALSH.
LOOM FOR WEAVING ORIENTAL RUGS.
APPLICATION FILED APR. 3, 1911.

1,117,115.

Patented Nov. 10, 1914.
11 SHEETS—SHEET 7.

Witnesses:
Edward R. Parker.
Edward Maxwell

Inventor:
Thomas P. Walsh
by Geo. H. Maxwell,
Attorney.

T. P. WALSH.
LOOM FOR WEAVING ORIENTAL RUGS.
APPLICATION FILED APR. 8, 1911.
1,117,115.
Patented Nov. 10, 1914.
11 SHEETS—SHEET 8.
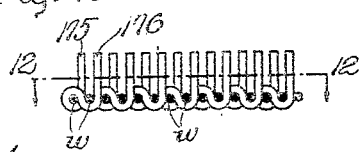
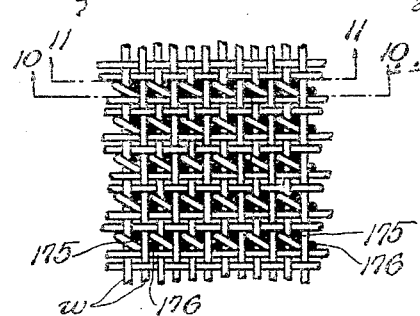
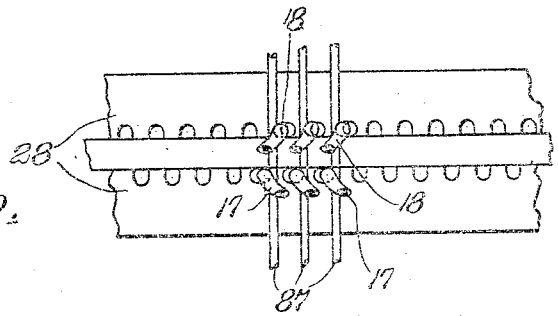
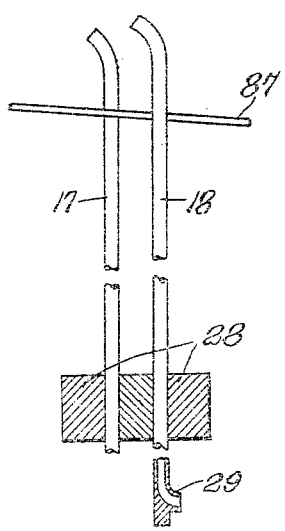
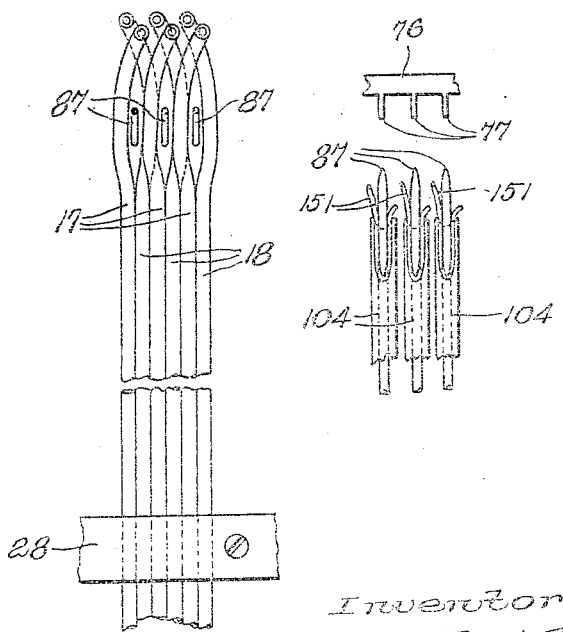
Witnesses:
Edward R. Parker
Edward Maxwell
Inventor:
Thomas P. Walsh,
by Geo. W. Maxwell
Attorney.

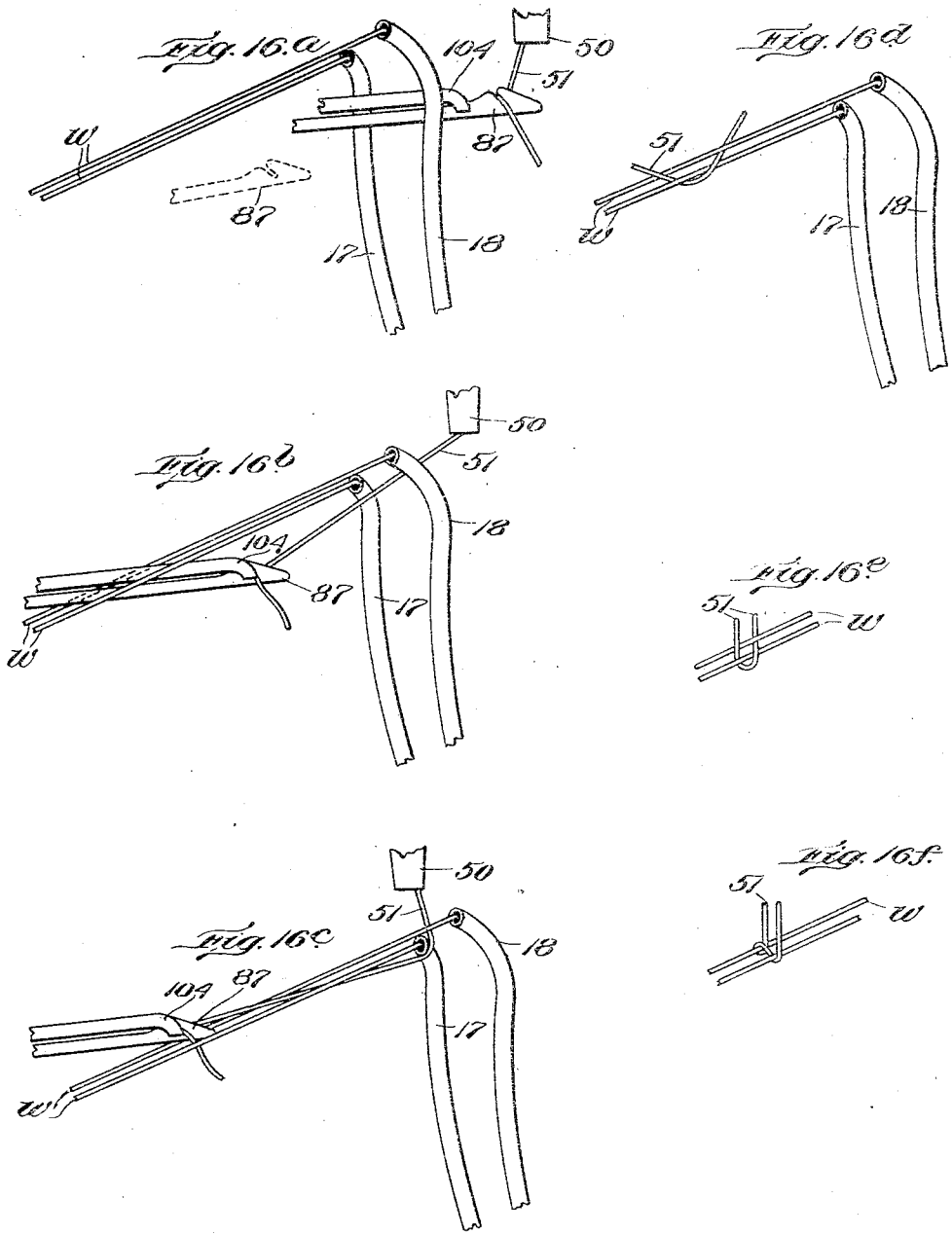

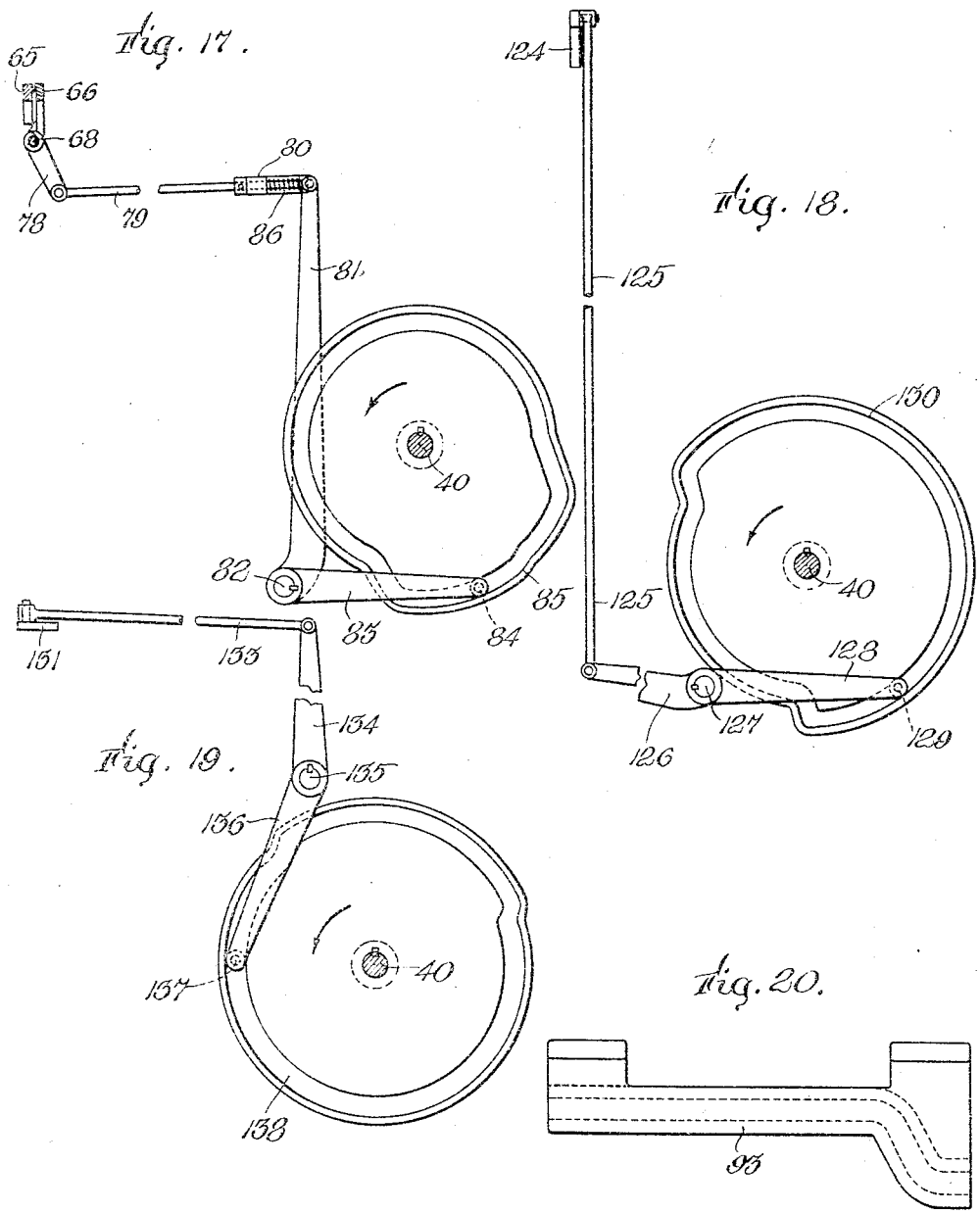

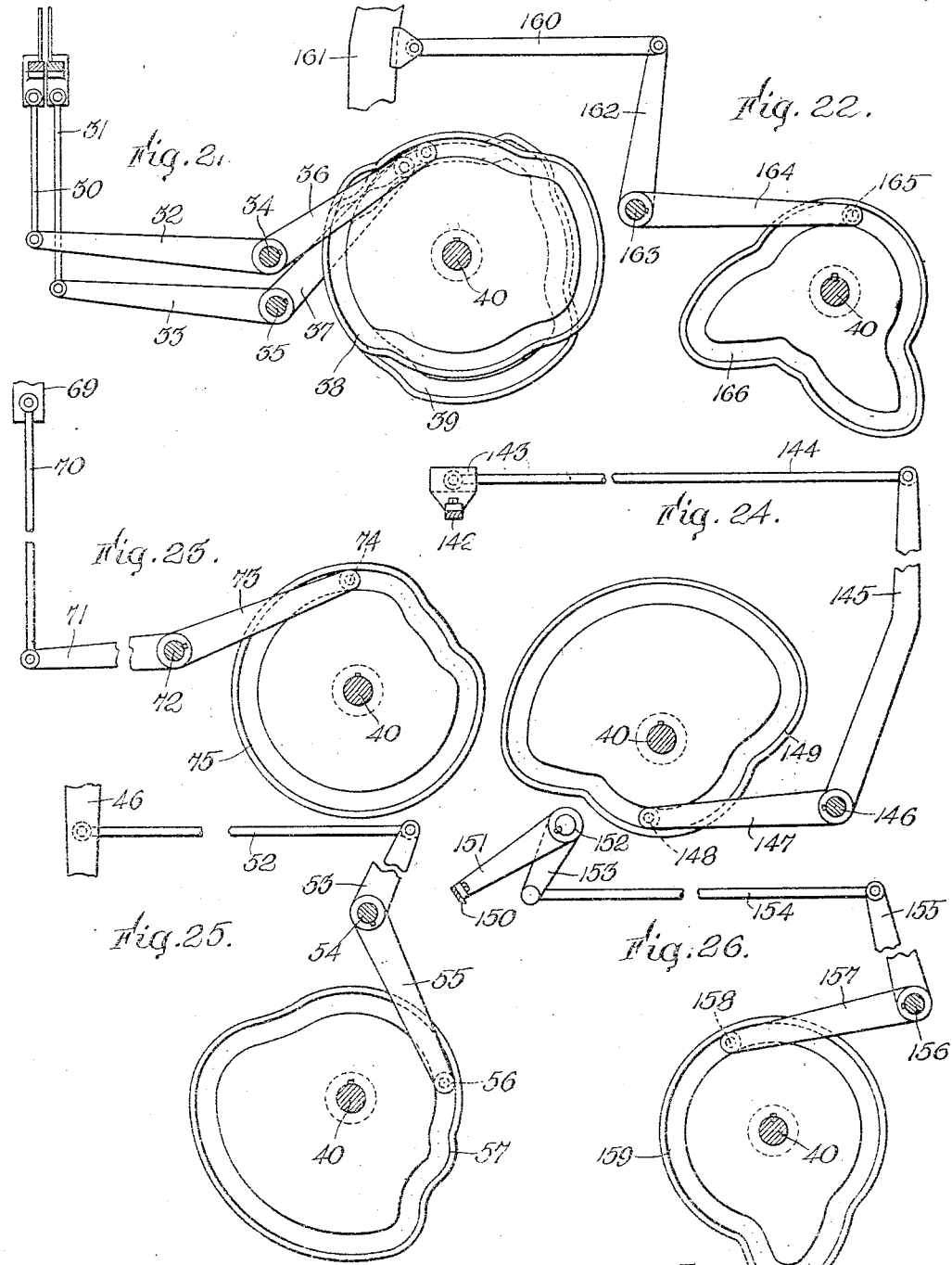

UNITED STATES PATENT OFFICE.

THOMAS P. WALSH, OF BOSTON, MASSACHUSETTS, ASSIGNOR TO WALSH-BAKER CORPORATION, OF PORTLAND, MAINE.

LOOM FOR WEAVING ORIENTAL RUGS.

1,117,115.  Specification of Letters Patent.  Patented Nov. 10, 1914.

Application filed April 3, 1911.   Serial No. 618,623.

*To all whom it may concern:*

Be it known that I, THOMAS P. WALSH, a citizen of the United States, and resident of Boston, in the county of Suffolk and State of Massachusetts, have invented an Improvement in Looms for Weaving Oriental Rugs, of which the following description, in connection with the accompanying drawings, is a specification, like letters on the drawings representing like parts.

My present invention is a loom for weaving oriental rugs, carpets, etc., whereby the advantages of the Axminster-spool system of weaving are combined with the certainty, rapidity and freedom of the needle or hook drawing-in system of weaving. Without attempting to enumerate the advantages of using an Axminster spool, as said advantages are mainly well recognized, I wish to point out that the use of an Axminster spool gives an opportunity for a much wider range and greater variety of color effects and yarn selections than is practicable with the other well known forms of pattern weaving, such for instance as the jacquard. On the other hand, the ordinary Axminster loom (employing these Axminster spools) is subject to more or less uncertainty, which is increased rather than decreased by employing said spools in connection with the tying of oriental knots. The hooked drawing-in type of mechanism is well recognized as affording great precision and certainty of yarn movements.

Accordingly my present invention resides in combining the needle or hook drawing-in type of mechanism with the Axminster-spool type of mechanism. This I believe to be broadly new.

In addition to this broad feature, my invention further resides in so combining these two types of mechanisms as to tie oriental knots, i. e. to weave an oriental product.

My invention will be further amplified and more clearly understood in connection with the following description, taken with reference to the accompanying drawings, in which I have shown one preferred form of my invention applied to a loom having, as nearly as practicable, the usual shape and accessories.

Figure 2:
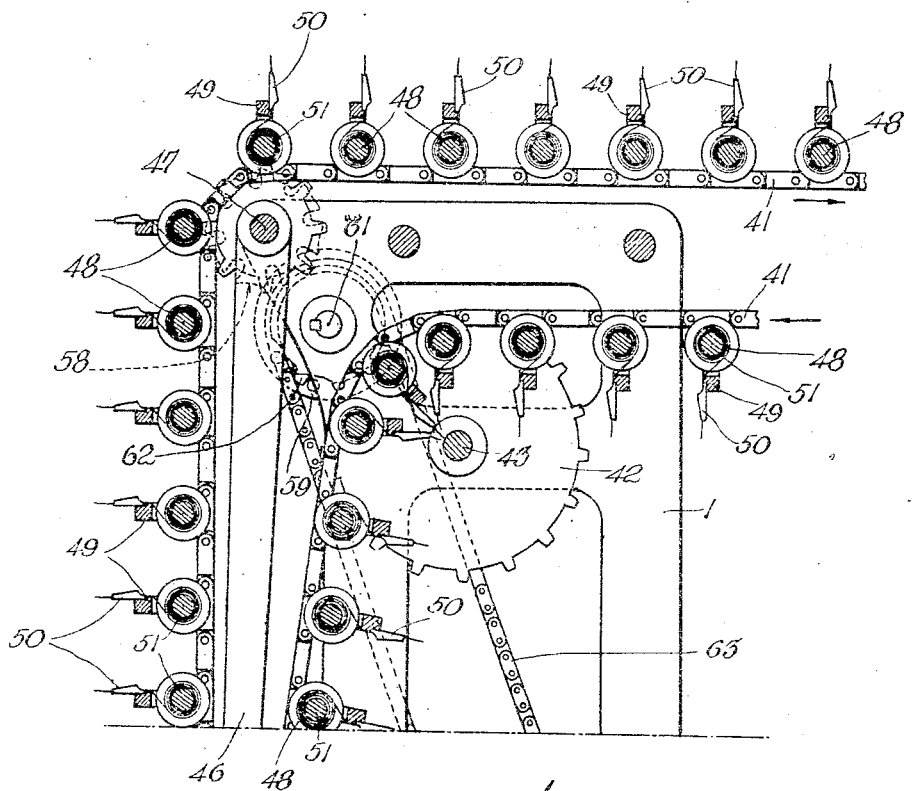
Figure 3:
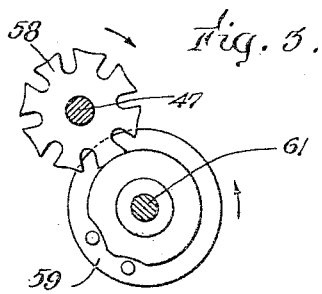
Figure 6:
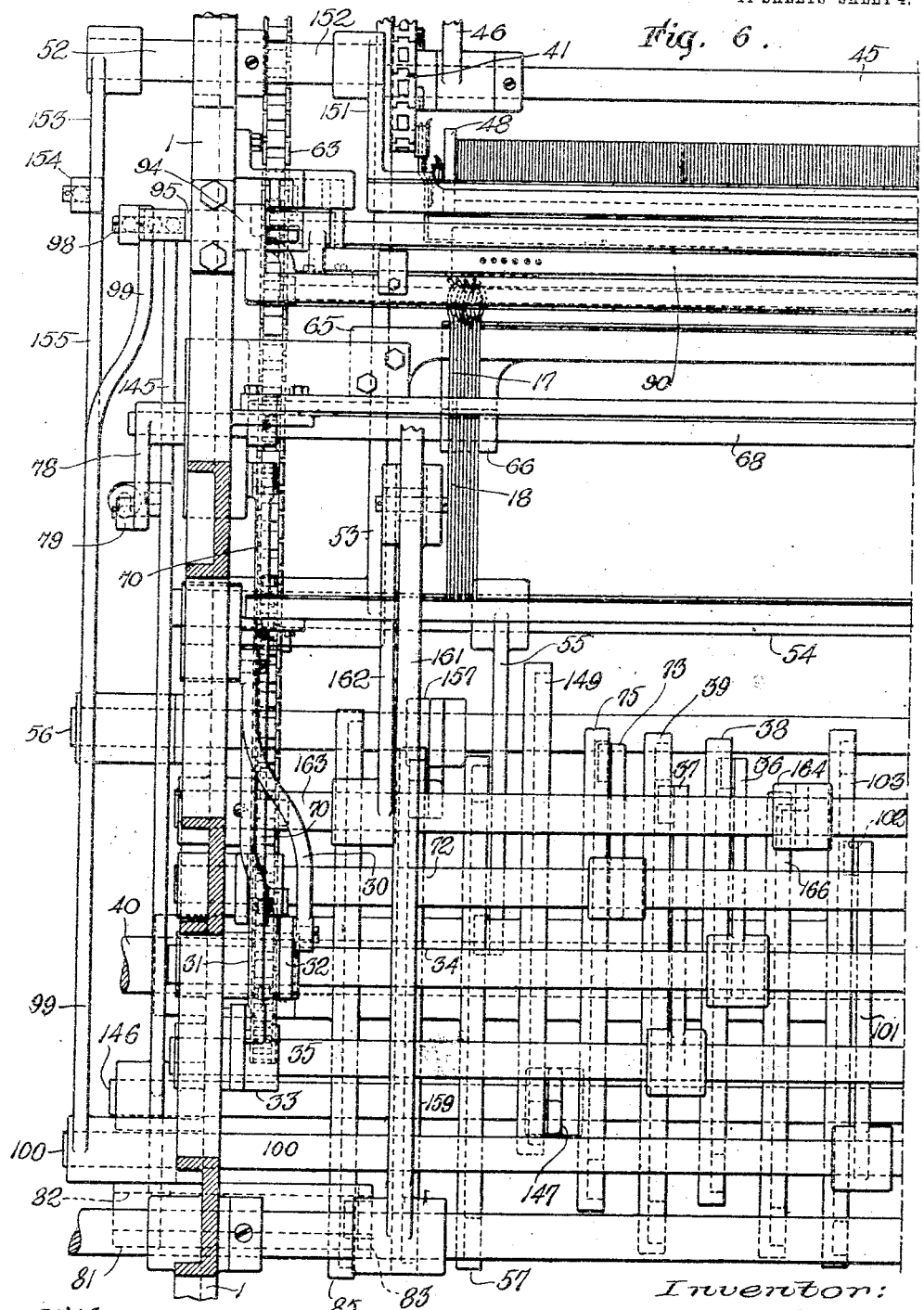
Figure 7:
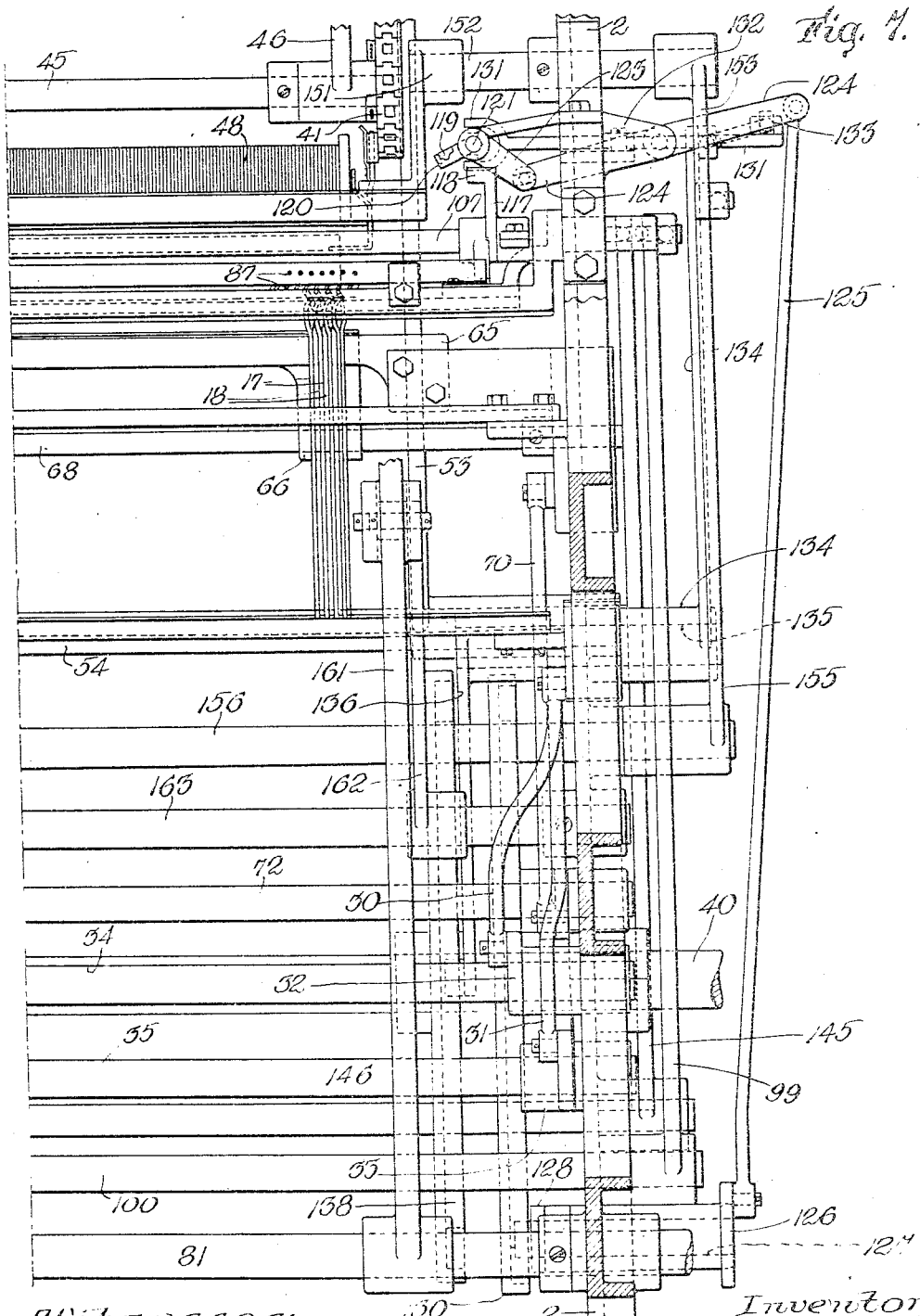
Figure 8:
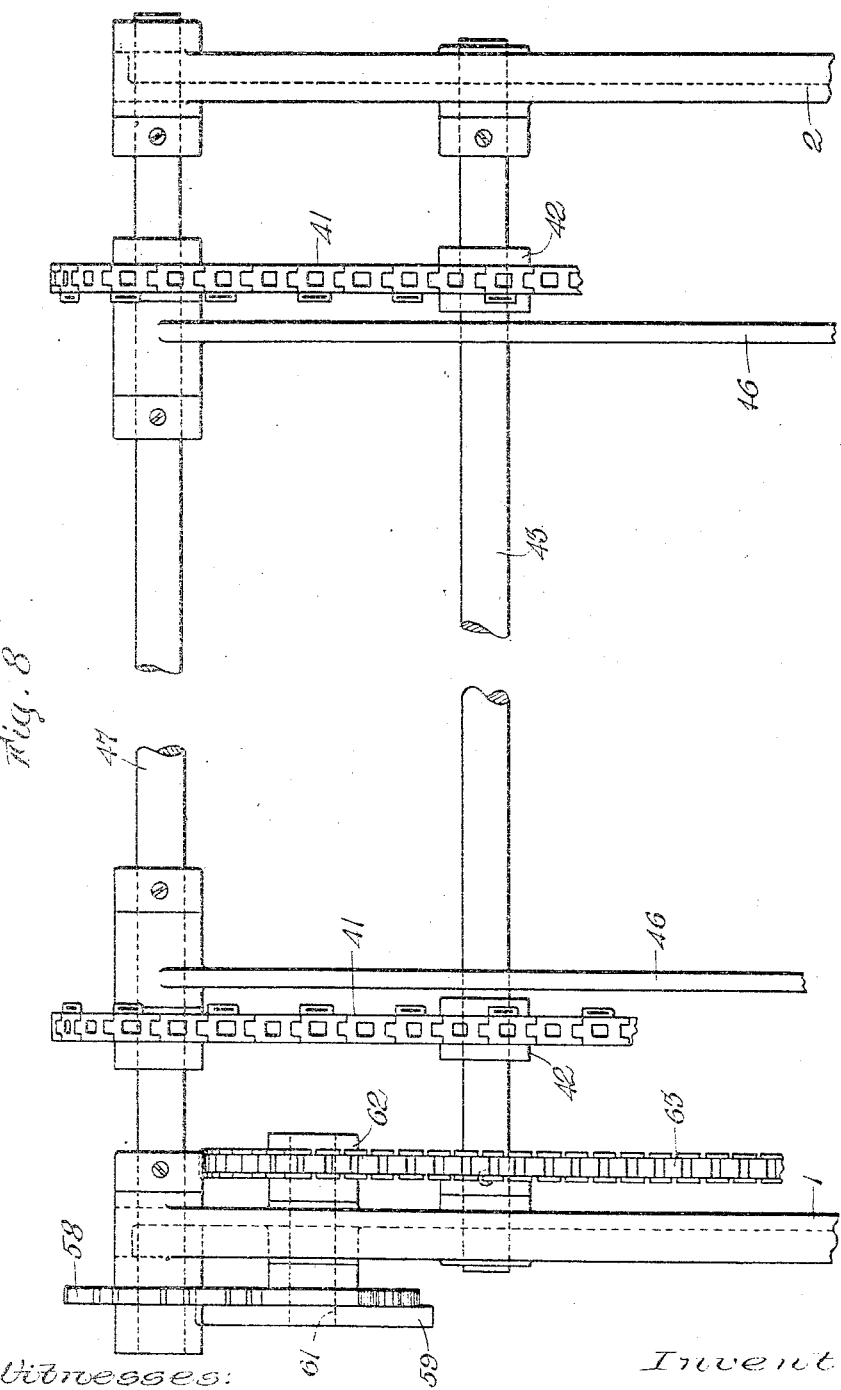
Figure 9:
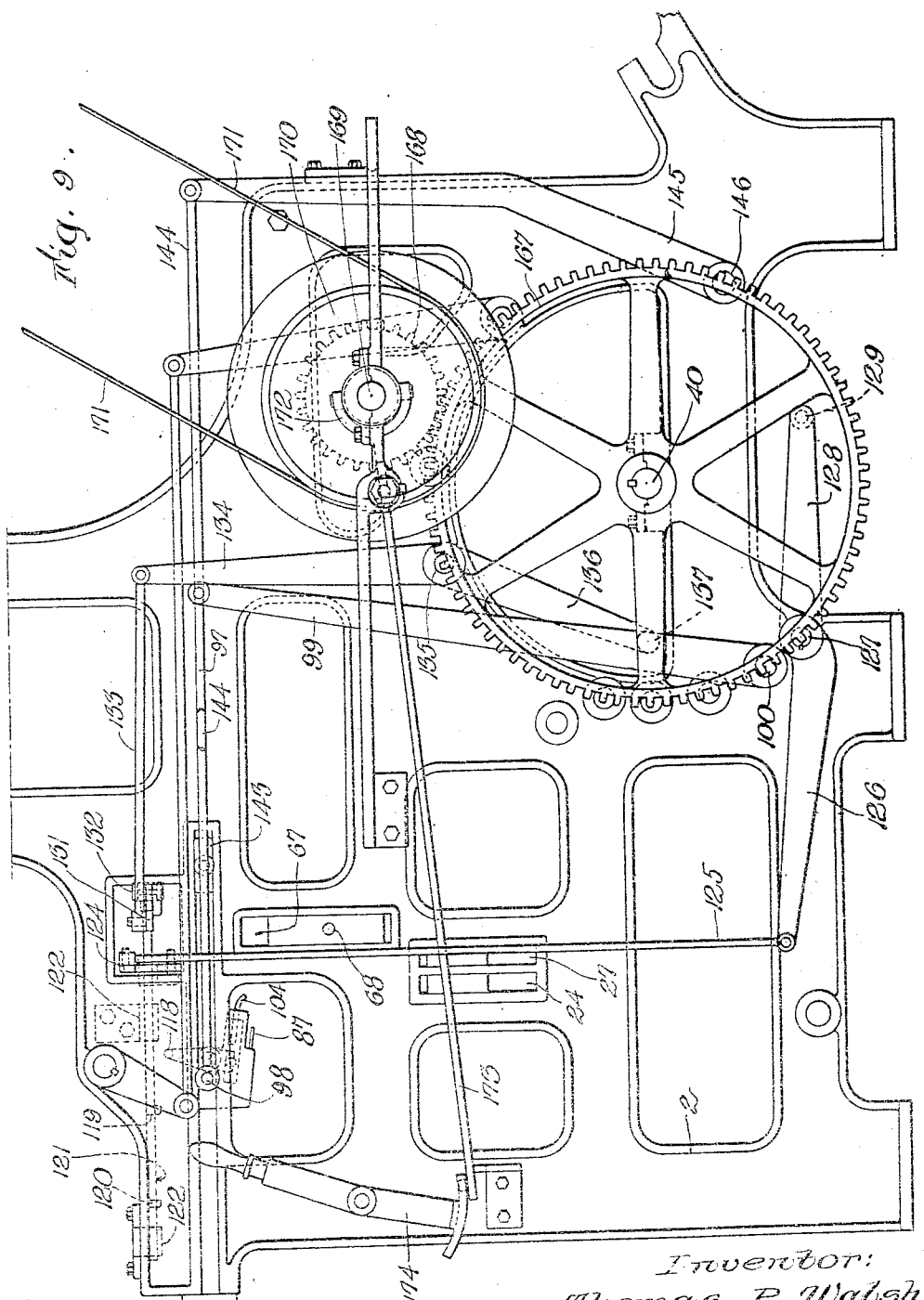

In the drawings, Figure 1 is a central vertical sectional view of the loom partly broken away for convenience of illustration; Fig. 2 is a similar sectional view of the upper part of the loom, similarly broken away for the same purpose; Fig. 3 is a sectional detail similar to Fig. 2 of a portion of the driving mechanism thereof; Fig. 4 is a similar sectional view enlarged of a portion of Fig. 1; Fig. 5 is a fragmentary perspective view of a part of the color yarn holder; Figs. 6 and 7 are views in front elevation of the part of the loom shown in Fig. 1, the take-up mechanism and front ends of the loom frame being removed and broken away; Fig. 8 is a similar front view of the mechanism shown in Fig. 2, the spools being omitted; Fig. 9 is a right hand side elevation of the loom; Figs. 10 and 11 are sectional views of the fabric taken respectively on the dotted lines 10—10 and 11—11, Fig. 12; Fig. 12 is a horizontal sectional view on the line 12—12, Fig. 10; Fig. 13 is a top plan view of the mechanism shown in Figs. 14 and 15; Figs. 14 and 15 are views in side elevation and front elevation respectively of the warp holders, partly broken away; Fig. 16 is a fragmentary plan view of the hooks, color yarn holders, and nipper comb in their relative position; Figs. 16$^a$, 16$^b$, 16$^c$, 16$^d$, 16$^e$, and 16$^f$ are perspective views illustrating the method of the weaving; Fig. 17 is a sectional view showing in side elevation the cam mechanism for operating the nipper-closer; Fig. 18 is a similar view of the cam and connections for locking and unlocking the color yarn holder; Fig. 19 is a similar view of the cam and connections for reciprocating the color yarn holder; Fig. 20 is a top plan view of the cam which rocks the needles; Fig. 21 is a sectional view showing in side elevation the cams and connections for raising and lowering the warp thread holders; Fig. 22 is a similar view of the cam and connections for swinging the lay; Fig. 23 is a similar view of the cam and connections for raising and lowering the nippers; Fig. 24 is a similar view of the cam and connections for actuating the knot positioner and shear member; Fig. 25 is a similar view of the cam and connections for swinging the spools forward and back; and Fig. 26 is a similar view of the cam and connections for operating the movable shear blade.

At the front of the loom, between the sides 1 and 2, is herein shown a usual take-up mechanism, comprising a cloth roll 3, take-up roll 4 and guide rolls 5, 6 and actuating mechanism 7, 8, 9, 10, 11, 12, 13, and 14 for taking up the woven fabric, indicated at 15, which passes over the breast beam 16, whence the warp threads $w$ extend rearwardly to and through warp-thread holders 17, 18 passing out at 19 and back over a guide roll 20 to the source of supply or warp beam 21 at the rear end of the loom. The warp holders 17, 18 are shown in detail in Figs. 13-15, where it will be seen that each holder is bent outwardly, viewing Fig. 15, adjacent the top of the holder and then said top is bent inwardly again until the two holders of a pair overlap each other. These holders are placed at the rear of each other, as clearly shown in Fig. 4, the holders 17 being rigidly mounted in a cross bar 22 supported by end stands 23 vertically movable in slots or ways 24, and the holders 18 being rigidly mounted in a similar cross bar 25 supported on end stands 26 movable in the guideways 27 of the end frames. Preferably as high as practicable, I provide a transverse guide 28 for guiding and stiffening the holders in their up and down movements. The warp-thread holders are hollow and provided with a curved entrance neck 29, as best shown in Fig. 14, for the entrance of the warp thread $w$, and are bent in an opposite or forward direction at their upper ends for the smooth delivery of the warp threads. This mechanism per se is not herein claimed, as it has been duly presented and claimed in my application Serial No. 577,838. The vertical reciprocations of these holders is accomplished through links 30, 31, arms 32, 33 on the ends of rock shafts 34, 35 whose cam levers 36, 37 travel in path cams 38, 39 on a cam shaft 40. (Fig. 21). Above the mechanism just described, on the upwardly projecting tops of the end frames, is mounted the color-yarn-spool mechanism, comprising a usual spool chain 41 passing over idler sprockets 42 mounted on a shaft 43 in said end frames and thence downwardly and around sprockets 44 carried on the outer ends of a shaft 45 mounted in the lower free end of a swinging frame 46 freely pivoted at its upper end on a sprocket shaft 47. The spool chain 41 carries in usual manner any usual or preferred kind of so-called Axminster spools 48 each provided in usual or preferred manner with a tube frame 49 through whose tubes 50 the free ends of the color yarns 51 project in well known manner. I have omitted to show the full chain, as the rear portion thereof will pass over usual idlers such as are commonly provided in connection with Axminster looms and will be of such length as the pattern requires. The swinging movement of the spool-chain frame 46 is provided by means of links 52, arms 53, rock shaft 54 and a cam lever 55 whose roll 56 travels in a path cam 57 (Fig. 25). The required step-by-step feeding movement of the spool chain 41 which brings the successive complements of color yarns into weaving position (preferably after every second beating-up movement) is herein shown as a Geneva movement 58, 59, the latter being mounted on a shaft 61 on whose inner end, see Figs. 2 and 8, is a sprocket wheel 62 engaged by a sprocket chain 63 driven by a sprocket wheel 64 on the cam shaft 40, see Fig. 1.

As a spool 48 and its complement of yarns 51 is being advanced by the spool chain 41, its freely projecting yarn-ends engage against the rear face of the front fixed-jaw member 65 of the nipper, see Fig. 4, whose movable-jaw member 66 is then swung back entirely open, the nipper being at this time raised approximately to the top of the guide slot 67 so that the jaw 65 is relatively close to the depending ends of the tubes 50. Thereupon, as the spool 48 and its tubes 50 are coming to their position shown in Fig. 4, the nipper closes loosely onto the projecting yarns and lowers to the position shown in said Fig. 4. As herein shown, one of the nipper members, viz. 65, is fixed and the other, 66, is movable, being pivoted on a shaft 68 mounted at its ends in slide blocks 69 (which also carry the fixed jaw 65), said slide blocks being movable in the slideways or guides 67 and operated up and down by links 70, arms 71 (Fig. 23) rock shaft 72 and cam lever 73 whose roll 74 is actuated by a cam 75. At the upper free end of the swinging nipping jaw 66, I mount a comb 76 whose teeth 77 project forward as shown in Fig. 4, so that when the jaw 66 is moved toward the jaw 65, said teeth enter between the yarn-ends (the nipper being then in its raised position so that this combing action of the comb teeth 77 takes place close to and preferably almost at the very ends of the tubes 50). Then, as already stated, the jaws close on the yarn-ends loosely and do not close tightly upon said yarn-ends until the nipper is moved down a slight distance, thereby permitting the yarn-ends to slip somewhat until the comb teeth 77 have combed them out straight, whereupon the jaws 65 and 66 close tightly upon the yarn-ends with sufficient pressure to hold them thereafter until they are properly engaged and secured by the hooks. The opening and closing movement of the nipper jaws is herein shown as accomplished by a rocker arm 78, Fig. 17, projecting from the rock shaft 68 which carries the jaw 66, said rocker arm connecting with links 79 and 80 actuated by an arm 81 of a rock shaft 82 whose lever 83 has its cam roll 84 actuated by a path cam 85. To prevent the nipper jaws from cutting the delicate yarn-ends off, as would be liable to be the case under a positive unyielding pressure, I provide the two links 79, 80 and an intervening spring 86 to cushion the bite of the jaws upon the yarn. As soon as the yarns are combed out straight and pulled down to the position shown in Fig. 4, needle-like hooks 87 are moved forward through the openings formed by the lateral bulges in the needles or warp holders, as shown best in Figs. 4, 13–15, between the respective color yarns, then held taut by the nipper. These hooks are mounted in a carrier bar 88 and have crank shaped rear ends 89 mounted in a slide bar 90 whose upright 91 is provided with a cam roll 92 actuated by a stationary cam 93, Fig. 20, fast on the main frame. The carrier bar 88 has upturned ends 94 provided with outwardly extending ribs or slide bearings 95 traveling in guide-ways 96 in the end frame and actuated by links 97 engaging studs 98 thereon, said links being operated by levers 99, Figs. 1 and 9, rock shaft 100 and cam lever 101 whose roll 102 travels in a path cam 103 on the cam shaft 40. Thus, as the hooks 87 are moved in or rearwardly, they are in upstanding position as shown in dotted lines, Fig. 4, throughout most of their inward movement, being turned toward the end of their movement from said upstanding position to a horizontal position by the cam 93 so that, upon the beginning of their backward movement, each hook catches a color yarn and starts back with it, being turned back into upstanding position again so as to give said yarn a bend or to interlock the yarn with the hook. Thereupon, a locking device grips the yarn firmly against the hook so as to hold it immovably onto the hook in its backward movement and thereby prevent the yarn from being pulled off from the hook by any slight resistance offered to it by the warp-thread holders 17, 18 and the tube frame of the spool.

The locking mechanism is herein shown as consisting of projecting color yarn holders 104 projecting like comb teeth from a carrying plate or bar 105 mounted to slide at each end in a slot 106 formed therefor in the inner portion of the upturned end 94 of the hook carrier 88, said holder carrier 105 being given a slight forward and backward movement by a rock shaft 107 provided at each end with a depending finger 108 slotted to straddle a stud 109 projecting from a tail piece from the adjacent end of the carrier plate 105. A spring detent 112 is fastened on the upturned end 94 adjacent each end of the carrier plate to engage a notch in said tail piece, two of said notches being herein shown, one for positioning the holders 104 in their forward position with relation to the hooks and the other to position said holders in their rear position with relation to the hooks.

Each color yarn holder 104 at its forward end is provided with an upper groove 113, an under groove 114, projecting ends 115 and depending wings 116, so that when the yarn has been engaged by a hook, and said holder 104 is slid along on the shank of the hook toward the yarn, the hook or projecting nib thereof enters the groove 113 while the wings 115 and 116 embrace the yarn at the bight of the hook and thereby firmly and immovably clamp the yarn in its bent position in and about the hook. The color yarn holders 104 are moved to their locking and unlocking positions by the rock shaft 107 which has at its right hand end, see Fig. 7, an upwardly extending arm 117 provided with a finger 118 in position to be engaged by one or the other of a pair of lugs 119, 120, Fig. 9, carried by a rock shaft 121 mounted in bearings 122 on the end frame and given its rocking movement by an arm 123, intermediately pivoted lever 124, link 125, arm 126, rock shaft 127 and cam lever 128 whose roll 129 is actuated by a cam 130, Fig. 18. The rock shaft 121 is given a sliding movement by a forked lever 131 pivoted at 132 and engaged by a connector 133 at its outer end reciprocated longitudinally by an arm 134, rock shaft 135 and cam lever 136 whose cam roll 137 is actuated by a path cam 138, Fig. 19.

When the hooks 87 are in their full line position, Fig. 4, the rock shaft 121 is turned as shown in full lines in Fig. 7 so that its lugs 119, 120 are out of the path of movement of the finger 118 which actuates the color yarn holders 104 with relation to the hooks, so that the holders 104 and hooks 87 are moved forward or toward the front of the loom together until the hooks get into their first dotted position as indicated in Fig. 4, at which time the finger 118 has gotten forward of the lug 119, i. e. to the left thereof, Fig. 9, whereupon the rock shaft 121 is rocked so as to turn these lugs downwardly and then said rock shaft is slid forward quickly so as to engage the finger 118 and thereby rock the shaft 107 to shift rearwardly the locking mechanism until the spring 112 catches into the other notch from that shown engaged in Fig. 4, the result being that the color yarn holders 104 are thereby slid along the hooks, until their wings 115, 116 clamp the yarn in bent and locked position about the hooks. The hooks and color yarn holders then go forward together, and when said hooks have arrived at their second dotted position as shown in Fig. 4, i. e. at the fell, the shaft 121 is slid quickly rearward so that its lug 120 thereby reverses the movement of the rock shaft 107 and moves the holders 104 out of locking engagement with the yarn ends in the hooks 87. This takes place after the shuttle 139 and the lay 140 has shot a pick of binder filling through the shed and the beating-up comb 141 has beat up said filling. The lug 120, having performed its office of unlocking the yarns from their grasped position, is turned back to its inoperative position, Fig. 7, and the hooks are moved back to their extreme left hand dotted position, Fig. 4, entirely out of engagement with the color-yarn ends, which are now held in the fabric by the binder filling. At the same time that the hooks have been moving forward with the yarn ends, the spool 48 and its tube frame have been moving forward in even pace therewith by the swinging action of the frame 46 under the influence of its swinging mechanism already described. Also a knot positioner 142, best shown in Fig. 4, has likewise been moving forward. This knot positioner is herein shown as a bar extending across the frame and supported at its opposite ends in sliding brackets 143 mounted to travel in the slots 96 and actuated by links 144, Fig. 24, arms 145, rock shaft 146 and a cam lever 147 whose roll 148 travels in a path cam 149, see also Fig. 1. The knot positioner 142 moves forward slightly faster than the spool and tube frame, its end brackets 143 passing by the ends of the tube frame 49 so that, by the time the hooks 87 and tubes 50 have moved the color yarns to the fell, the knot positioner is in engagement with the yarns. As the knot positioner is relatively close to the warp threads, it aids in pushing the knots and color yarns to the fell and aids the tubes 50 in holding them in exactly right position, and the beating-up comb, after the filling has been placed, beats up said filling to hold the knots stable. The forward stopping position of the knot positioner 142 is indicated in dotted lines just above and at the rear of the second dotted position of the hooks. The knot positioner having arrived at this position and the filling having been shot, the beating-up accomplished, and the hooks 87 having moved forward to their most forward position as indicated in dotted lines above the breast beam, a coöperating cutting device, shown as a shear blade 150, swings down to meet the member 142 whose front lower edge constitutes the other shear blade, so that by the meeting of these two at the fell, the yarn ends are severed from the body of the yarn below the free ends of the tubes 50 of the tube frame and spool which is then furnishing the color yarns for weaving. This cutter bar or shear blade 150 is supported at the lower ends of swinging arms 151 each carried by a stud or short rock shaft 152, Figs. 1, 4, 6, 7, and 26, actuated by levers 153, links 154 and arms 155 extending from a rock shaft 156 having a cam lever 157 whose roll 158 travels in a path cam 159 on the cam shaft 40.

The lay or lay beam 140 is operated by links 160 connecting at their forward ends to the pivoted lay sword 161 and at their rear ends to arms 162 of a rocker shaft 163 having a cam lever 164 whose roll 165 travels in a path cam 166, Fig. 22, on the cam shaft 40. The cam shaft 40 is provided with a gear 167, Fig. 9, meshing with a pinion 168 fast on a drive shaft 169 which carries a drive pulley 170 driven by a belt 171, said pulley being provided with a usual clutch whose shipper fork 172 has its lever 173 actuated by a shipper handle 174 in the usual manner.

The weave herein shown is the well known Persian-knot weave of oriental rugs, a complete knot comprising two tuft ends 175, 176, the former passing down under and entirely around a warp thread $w$ and thence down under the next warp thread $w$ and up to constitute the tuft end 176.

In operation, the spool chain 41 is moved a step forward by its Geneva movement 58, 59 so as to bring the next spool of selected color yarns into weaving position, the swinging frame 46 thereof being then in its rear position as shown in Fig. 1. The projecting yarn ends from the lowermost or positioned spool 48 hang downwardly from the outer or lower ends of the tubes 50 in position to be grabbed and combed and held taut by the nipper mechanism while the hooks come forward and engage the yarns. To accomplish this, the nippers 65, 66 are moved upwardly by the operating mechanism shown in Fig. 23, the jaw 66 being then swung rearwardly and downwardly by the mechanism shown in Fig. 17 and the jaw 65 being at about the top of the slot or way 67, so that as the yarn ends from the tubes 50 are being swung down into vertical position, they strike against this fixed jaw 65 and thereupon the movable jaw 66 moves forward to engage said yarn ends loosely, the teeth 77 of the nipper comb likewise entering between the respective yarn ends close to the free ends of the tubes 50. As the nipper then begins to move downwardly, the comb straightens out and positions the yarn ends accurately, the operating mechanism of the jaw 66 meanwhile moving said jaw firmly against the opposite jaw 65 so that as the nipper reaches its lowered position as shown in Fig. 4, the yarn ends are held firmly against slipping between the nippers, and the comb teeth 77 coöperate with the tubes 50 to position the individual yarns in accurately spaced relation entirely across the loom, so that as the hooks 87 come forward, said yarns are not only held taut but spaced correctly for proper and certain engagement by the pulling-in mechanism or hooks. As the nippers were moving down, the warp-thread holders 17 and 18 were being moved up from their previous position approximately level with the breast beam, and likewise the hooks 87 were being moved rearward from above the breast beam, so that as said warp thread holders 17 and 18 reached their upper position as shown in Fig. 4 and the selected yarn ends had been gotten into their taut spaced relation, the hooks were passing through the openings formed by the bulges at the upper ends of the warp-thread holders 17, 18. As soon as the hooks pass between the warp-thread holders, the hooks are turned from their vertical position to their horizontal position by the cam 93 (Fig. 20) and shifting bar 90 in engagement with the crank ends 89 of said hooks, Fig. 4. The hooks go rearward until they have passed between the selected color yarns now being held taut to insure the proper entrance of said hooks between the color yarns to the position shown in Fig. 4. The hooks then start back toward the front of the loom, each hook engaging its yarn end and then being turned into vertical position again whereupon the nippers release the yarn ends, the spool 48 and its tubes start to swing forward in substantially even movement with the travel of the hooks until said hooks and tubes have reached approximately the dotted positions shown at the right, Fig. 4, the result being that the yarn ends are drawn to proper position in the hooks (thereby avoiding an unnecessary waste of yarn).

As soon as the finger 118 which moves forward with the hooks and their carriage has passed the lug 119, the latter is rocked into lowered position behind said finger, and is then quickly moved forward by the mechanism Fig. 19 (see also Figs. 7 and 9), thereby moving all the color yarn holders 104 of the locking mechanism to the rear so as to bite against and pinch or lock the yarn ends immovably in the hooked ends of the hooks, as shown in Fig. 16. As this locking takes place, the warp-thread holders 17, 18 are lowered, the former 17 being lowered fully to form the bottom of the shed for the first binder thread, and the holder 18 being lowered approximately level with the breast beam just sufficiently so as not to interfere with any of the other concurrent movements, especially of the knot positioner. The knot positioner 142 is meanwhile being moved forward, and as the warp-thread holder 18 reaches about level with the breast beam, the hooks, their locking mechanism, and the spool and tubes again start forward until they arrive at the fell, the knot positioner reaching the same point at approximately the same time. Thereupon the warp-thread holders 18 move up again to constitute the upper portion of the shed for the first binder thread, which is then shot across, the lay beats up, and the warp-thread holders 17 and 18 are immediately reversed in their relative positions so as to form the next shed. While this reversing movement for the next shed is taking place, the locking devices are released by the rearward movement of the lug 120 acting upon the finger 118 to shift the color yarn holders 104 forward out of locking position with relation to the hooks, and this having been accomplished, the lugs 118, 120 are turned backward out of the way to inoperative position as shown in Fig. 7, and the hooks 87 are then moved entirely forward away from the fell, leaving the knotted color yarns in place at the fell, coiled about the warp threads in Persian knots. Thereupon the swinging shear 150 swings down to cut off the knotted color yarns from the body of yarn on the spool, and at about the time that this cutting off takes place, the second shot of filling is delivered through the shed and is then beaten up by the beating-up comb 141. The shear blade 150 then swings up to its position, Fig. 4, the chain 41 starts to advance, thereby starting to turn the now released spool and tubes upward while at the same time the frame 46 swings them back and the warp-thread holders 17, 18 move toward each other to level position, and the combined shear blade and knot positioner 142 moves to the rear, arriving there before the next spool of selected color yarns has reached its lowered position. This completes one cycle of weaving operations. The similar cycles of movements succeed each other automatically, thereby weaving the oriental fabric with that wide range of color effects or pattern variations which is made possible by the Axminster-spool mechanism and with that deftness and certainty of positioning and drawing-in operation which is made possible by the needle-like hook-mechanism, the fabric being taken up by the take-up mechanism in usual manner as the weaving progresses. The oriental knots are formed simultaneously row by row entirely across the loom, and the shearing likewise takes place simultaneously for all the knots in any given row entirely across the loom.

It will also be understood that within the spirit and scope of the appended claims, taken in connection with the drawings and description, my invention is capable of a wide range of mechanical embodiments, inasmuch as in many respects it is broadly new.

Having described my invention, what I claim as new and desire to secure by Letters Patent is:

1. In a loom, weaving mechanism, including an Axminster spool for selected pile yarns, and yarn-embracing means movable lengthwise of the warp threads and loom for engaging said yarns when presented by said spool and moving the yarns toward the fell while still held by the spool.

2. In a loom, weaving mechanism, including an Axminster spool for selected pile yarns and its tubes and tube frame, and yarn embracing means for engaging said yarns when presented by said tubes and moving the yarns through the web and warp threads and back again toward the fell while still held by the spool.

3. In a loom, weaving mechanism, including an Axminster spool for selected pile yarns and its tubes and tube frame, yarn embracing means movable lengthwise of the warp threads and loom for engaging said yarns when presented by said tubes, and operating mechanisms for moving said embracing means and the yarns held thereby toward the fell while said yarns are still held by the spool and for moving the spool also toward the fell while the yarns are held by said embracing means.

4. In a loom, weaving mechanism, including an Axminster spool for selected pile yarns and its tubes and tube frame, yarn embracing means movable lengthwise of the warp threads and loom for engaging said yarns when presented by said tubes, operating mechanisms for moving said embracing means and the yarns held thereby toward the fell while said yarns are still held by the spool and for moving the spool also toward the fell while the yarns are held by said embracing means, and means coöperating with the aforesaid for simultaneously coiling the yarns about the warp threads in oriental knots while being moved as aforesaid toward the fell.

5. In a loom, weaving mechanism, including an Axminster spool for selected pile yarns and its tubes and tube frame, yarn embracing means movable lengthwise of the warp threads and loom for engaging said yarns when presented by said tubes, operating mechanisms for moving said embracing means and the yarns held thereby toward the fell while said yarns are still held by the spool and for moving the spool also toward the fell while the yarns are held by said embracing means, means coöperating with the aforesaid for simultaneously coiling the yarns about the warp threads in oriental knots while being moved as aforesaid toward the fell, and a positioner for aiding in the forward movement toward the fell of the knotted yarns.

6. In a loom, weaving mechanism, including an Axminster spool, its tubes and tube frame, yarn embracing means movable lengthwise of the warp threads and loom for engaging said yarns when presented by said tubes and moving the yarns toward the fell while still held by the spool, and coöperating mechanism for pulling the woven yarns tight while their free ends are still held at the fell.

7. In a loom, weaving mechanism, including an Axminster spool, its tubes and tube frame, yarn embracing means movable lengthwise of the warp threads and loom for engaging said yarns when presented by said tubes and moving the yarns toward the fell while still held by the spool, means to lay binder thread, and beating up means to beat up the binder thread while said yarns are still held at the fell.

8. In a loom, weaving mechanism, including an Axminster spool, its tubes and tube frame, yarn embracing means movable lengthwise of the warp threads and loom for engaging said yarns when presented by said tubes and moving the yarns toward the fell while still held by the spool, means to lay binder thread, beating up means to beat up the binder thread while said yarns are still held at the fell, and severing means for thereafter severing the woven yarns from the spool.

9. In a loom, weaving mechanism, including a spool for selected pile yarns having their ends projecting free, and hooks for engaging the free ends of a plurality of said yarns when presented by said spool and moving the yarns toward the fell.

10. In a loom, weaving mechanism, including a spool for selected pile yarns, hooks for engaging said yarns when presented by said spool and moving the yarns toward the fell, and holding means for locking the yarns immovably in the hooks during movement.

11. In a loom, weaving mechanism, including a spool for selected pile yarns, its tubes and tube frames, and mechanism for engaging the free ends of the yarns from the tubes and intercoiling the yarn-ends with the warp threads in oriental knots.

12. In a loom, weaving mechanism, including a spool for selected pile yarns, its tubes and tube frames, and mechanism for engaging the free ends of the yarns at the tubes and intercoiling the yarn-ends with the warp threads in oriental knots a row at a time across the loom.

13. In a loom, means for supporting the warp threads, means for delivering pile yarns thereto, including a spool for selected pile yarns, and automatic pulling devices movable substantially together for separately engaging the respective pile yarns presented by and intact with said spool and pulling said yarns toward the fell into weaving relation with and between said warp threads.

14. In a loom, means for supporting the warp threads, means for delivering pile yarns thereto, including a spool for selected pile yarns, pulling devices for separately engaging the respective pile yarns presented by said spool and pulling said yarns toward the fell into weaving relation with and between said warp threads, and means coöperating with the aforesaid mechanism for coiling said pile yarns while still intact with the spool about the warp threads in oriental knots.

15. In a loom, means for supporting the warp threads, means for delivering pile yarns thereto, including a spool for selected pile yarns, pulling devices for separately engaging the respective pile yarns presented by said spool and pulling said yarns toward the fell into weaving relation with and between said warp threads, means coöperating with the aforesaid mechanism for coiling said pile yarns about the warp threads in oriental knots, and means for introducing binder thread behind the knotted pile yarns while still held by said pulling devices.

16. In a loom, means for supporting the warp threads, means for delivering pile yarns thereto, including an Axminster spool for selected pile yarns, its tubes and tube frame, pulling devices for separately engaging the respective pile yarns presented by said spool and pulling said yarns toward the fell lengthwise of the warp threads into weaving relation with said warp threads, means coöperating with the aforesaid mechanism for coiling said pile yarns about the warp threads in oriental knots, means for introducing binder thread behind the knotted pile yarns, and means for cutting off the knotted pile yarns from the spool supply after the laying of the binder thread.

17. In a loom having a series of spools, their tubes and tube frames, means for supporting said series of spools, their tubes and tube frames, means for moving said spools, tubes and frames, step by step into position to deliver successively their yarns for weaving, means for supporting warp threads, and weaving mechanism for coöperating with the aforesaid mechanism, including hooks for engaging the pile yarns presented by said spools and interweaving them with the warp threads in oriental-knot formation.

18. In a loom having an Axminster spool and its tubes and frame, weaving mechanism, including mechanism for placing the yarns in weaving relation to the warp threads, means for presenting said selected pile-yarn spool in operative position, and means independent of said spool and its tubes and frame for holding the projecting yarn-ends in proper spaced relation to be engaged by the yarn placing mechanism.

19. In a loom having an Axminster spool and its tubes and frame, weaving mechanism, including means for presenting said selected pile-yarn spool and its tubes and tube frame in operative position, means independent of the tubes for holding the projecting yarn ends beyond said tubes in proper spaced and straightened position to be engaged, and engaging means for moving said yarn ends lengthwise of the warp threads toward the fell.

20. In a loom having an Axminster spool and its tubes and frame, weaving mechanism, including means for presenting said selected pile-yarn spool and its tubes and tube frame in operative position, means independent of the tubes for holding the projecting yarn ends beyond said tubes in proper spaced and straightened position to be engaged, engaging means for moving said yarn ends lengthwise of the warp threads toward the fell, and means for also moving the spool with its tubes and tube frame toward the fell.

21. In a loom, an Axminster spool and its tubes and frame, weaving mechanism, including means for presenting said selected pile-yarn Axminster spool and its tubes and tube frame in operative position, means independent of the tubes of said spool for holding the projecting yarn-ends at a point beyond said tubes straightened and in proper spaced relation to be engaged, engaging means for engaging said spaced and straightened yarn-ends and moving said yarn-ends lengthwise of the warp threads toward the fell, and means for also moving the spool with its tubes and tube frame toward the fell while said yarns are intact from the spool to said engaging means.

22. In a loom, an Axminster spool, its tubes and tube frame, weaving mechanism including means for presenting said selected pile-yarn spool and its tubes and tube frame in operative position, means for straightening out and properly spacing the projecting yarn ends beyond the tubes while said ends are free, comprising a comb, and means for thereafter engaging the spaced yarn ends and moving the same toward the fell.

23. In a loom, an Axminster spool, its tubes and tube frame, weaving mechanism, including means for presenting said selected pile-yarn spool and its tubes and tube frame in operative position, means for straightening out and properly spacing the projecting yarn ends beyond the tubes, comprising a nipper and comb, and means for engaging the spaced yarn ends and moving the same toward the fell.

24. In a loom, an Axminster spool, its tubes and tube frame, means for presenting said selected pile-yarn spool, its tubes and tube frame in operative position, means for engaging and straightening out the projecting yarns at the free ends of the tubes, means for relatively moving said straightening means and tubes away from each other for rendering the yarn taut, and means for engaging the yarns while thus held and then moving them toward the fell.

25. In a loom, an Axminster spool, its tubes and tube frame, means for presenting said selected pile-yarn spool, its tubes and tube frame in operative position, means for engaging and straightening out the projecting yarns at the free ends of the tubes, means for relatively moving said straightening means and tubes away from each other for rendering the yarn taut, and drawing-in hooks for engaging the yarns while thus held and then drawing said yarns toward the fell.

26. In a loom, an Axminster spool, its tubes and tube frame, means for presenting said selected pile-yarn spool, its tubes and tube frame in operative position, means for engaging and straightening out the projecting yarns at the free ends of the tubes, means for relatively moving said straightening means and tubes away from each other for rendering the yarn taut, drawing-in hooks for engaging the yarns while thus held and then drawing said yarns toward the fell, and means for moving the spool and its yarns at the same time toward the fell.

27. In a loom, an Axminster spool, its tubes and tube frame, means for presenting said selected pile-yarn spool, its tubes and tube frame in operative position, means for engaging and straightening out the projecting yarns at the free ends of the tubes, means for relatively moving said straightening means, and tubes away from each other for rendering the yarn taut, drawing-in hooks for engaging the yarns while thus held and then drawing said yarns toward the fell, and holding means for locking the yarn in the hooks during the drawing-in movement.

28. In a loom, an Axminster spool, its tubes and tube frame, means for presenting said selected pile-yarn spool, its tubes and tube frame in operative position, means for engaging and straightening out the projecting yarns at the free ends of the tubes, means for relatively moving said straightening means and tubes away from each other for rendering the yarn taut, drawing-in hooks for engaging the yarns while thus held and then drawing said yarns toward the fell, and positioning means movable behind the yarns toward the fell for engaging the yarns and aiding in positioning them in their woven relation.

29. In a loom, an Axminster spool, its tubes and tube frame, means for presenting said selected pile-yarn spool, its tubes and tube frame in operative position, means for engaging and straightening out the projecting yarns at the free ends of the tubes, means for relatively moving said straightening means and tubes away from each other for rendering the yarn taut, drawing-in hooks for engaging the yarns while thus held and then drawing said yarns toward the fell, and shearing mechanism for severing the pile-yarn ends from the spool supply.

30. In a loom, an Axminster spool and its tubes and tube frame, means for moving said spool, tubes and tube frame with their complement of selected yarns into operative position, a comb for combing the yarns out straight and properly spaced, coöperating weaving means for thereafter engaging the projecting yarn-ends beyond the tubes, and means for moving said engaging means away from the tubes for the weaving of the yarns into the fabric.

31. In a loom, an Axminster spool, its tubes and tube frame, means for moving said spool, tubes and tube frame with their complement of selected color yarns into operative position, a comb for combing the yarn-ends out straight and spacing them, means for engaging the projecting yarn-ends beyond the tubes, said engaging means comprising movable jaws, means for opening and closing said jaws, and means for moving said engaging means away from the tubes.

32. In a loom, an Axminster spool, its tubes and tube frame, means for moving said spool, tubes and tube frame into operative position, coöperating weaving means for engaging the projecting straightened and spaced yarn-ends beyond the tubes, severing means for severing the yarns after they are woven, and means for releasing said engaging weaving means from the yarn-ends before the severing.

33. In a loom, an Axminster spool and its tubes and tube frame, means for moving a selected pile-yarn spool and its tubes and tube frame into operative position, and means for engaging the projecting yarn ends beyond the tubes, said engaging means comprising movable jaws, means for opening and closing said jaws, and means for moving said engaging means away from the tubes and weaving means for thereafter engaging the yarns and intercoiling the same with the warp threads.

34. In a loom, an Axminster spool and its tubes and tube frame, a nipper comprising two jaws, one of said jaws being movable away from the other, means to move said selected pile-yarn spool and its tubes and tube frame into position to bring the projecting yarn ends approximately against said other jaw, means for then moving said movable jaw toward said other jaw into clamping engagement with said yarn ends, and means for relatively separating said nipper and said spool when the yarn ends are thus held between the jaws of the nipper.

35. In a loom, an Axminster spool and its tubes and tube frame, a nipper comprising two jaws, one of said jaws being movable away from the other, means to move said selected pile-yarn spool and its tubes and tube frame into position to bring the projecting yarn ends approximately against said other jaw, means for then moving said movable jaw toward said other jaw into clamping engagement with said yarn ends, spacing mechanism for entering between the yarns before being held by the nipper and accurately maintaining the yarns in properly spaced relation while subsequently held by the nipper, and engaging devices for engaging the individual yarns while thus held and spaced.

36. In a loom, an Axminster spool and its tubes and tube frame, a nipper comprising two jaws, one of said jaws being movable away from the other, means to move said selected pile-yarn spool and its tubes and tube frame into position to bring the projecting yarn ends approximately against said other jaw, means for then moving said movable jaw toward said other jaw into clamping engagement with said yarn ends, spacing mechanism for entering between the yarns and accurately maintaining the yarns in properly spaced relation while held by the nipper, engaging devices for engaging the individual yarns while thus held and spaced, and coöperating mechanism for interweaving the yarns with the warp threads while moved by said engaging devices.

37. In a loom, an Axminster spool and its tubes and tube frame, a nipper comprising two jaws, one only of said jaws being movable away from the other, means to move said selected pile-yarn spool and its tubes and tube frame into position to bring the projecting yarn ends approximately against said other jaw, means for then moving said movable jaw toward said other jaw into clamping engagement with said yarn ends, including a yielding connection for preventing said jaws from harshly gripping the yarns.

38. In a loom containing a spool and its tubes and tube frame, a nipper comprising two jaws, one only of said jaws being movable away from the other, means to move said selected pile-yarn spool and its tubes and tube frame into position to bring the projecting yarn ends approximately against said other jaw, means for then moving said movable jaw toward said other jaw into clamping engagement with said yarn ends, including a yielding connection for preventing said jaws from harshly gripping the yarns, and means for moving the nipper away from the spool the distance required by the engaging devices, and said engaging devices for receiving the yarn-ends from said nipper jaws and moving the yarn-ends between the weft threads into weaving relation with said threads.

39. In a loom, weaving mechanism, and coöperating pile-yarn-delivering mechanism, including a frame mounted to swing from a fixed pivot, a spool chain carried by said frame, a complement of selected pile-yarn spools carried by said chain, means for moving said chain on said frame step by step, and means for swinging the frame toward the fell for each pile-forming operation.

40. In a loom, weaving mechanism for weaving the ground fabric, and mechanism for introducing piles into said ground fabric, including a selected pile-yarn spool and its tubes and tube frame, a nipper for applying a pulling strain to the yarn ends projecting from the tubes, said nipper being located at a distance from the fell, and means for moving said spool and its connected parts forward and back between said nipper and the fell.

41. In a loom, weaving mechanism for weaving a pile fabric, including drawing-in hooks for moving the pile yarns between and into weaving relation with the warp threads, and yarn holders mounted to slide on said hooks and provided with means for engaging and clamping the yarn into the hooked ends of the hooks, and mechanism for sliding said holders with relation to the hooks for locking the pile yarns in proper position in the hooks for the free movement of the hooks and unlocking the pile yarns adjacent the fell.

42. In a loom, weaving mechanism for weaving a pile fabric, including reciprocating hooks for drawing in the pile yarns between the warp threads, and locking means also movable with said reciprocating hooks for locking the yarns into and fast on the hooks.

43. In a loom, weaving mechanism for weaving a pile fabric, including reciprocating hooks for drawing in the pile yarns between the warp threads, locking mechanism for locking the yarns in the hooks, means for moving said hooks after engagement with the yarns and before being locked for a short distance to permit the yarns to slip in the hooks into proper position, and means for then operating the locking mechanism to lock the yarns during further movement of the hooks.

44. In a loom, weaving mechanism for weaving a pile fabric, including reciprocating hooks for drawing in the pile yarn between the warp threads, locking mechanism for locking the yarns fast in the hooks, means for moving said hooks after engagement with the yarns and before being locked for a short distance to permit the yarns to slip in the hooks into proper position, means for then operating the locking mechanism to lock the yarns during further movement of the hooks, and means to unlock said locking mechanism at the fell, to permit the hooks to withdraw from the pile yarns.

45. In a loom, weaving mechanism for weaving a pile fabric, including reciprocating hooks for drawing in the pile yarn between the warp threads, locking mechanism for locking the yarns fast in the hooks, means for moving said hooks, after engagement with the yarns and before being locked, for a short distance to permit the yarns to slip in the hooks into proper position, means for then operating the locking mechanism to lock the yarns during further movement of the hooks, means to unlock said locking mechanism at the fell to permit the hooks to withdraw from the pile yarns, and shearing mechanism for thereafter severing the pile yarn.

46. In a loom, weaving mechanism for weaving a pile fabric, including reciprocating hooks movable between the warp threads, means for rocking said hooks, and locking mechanism, comprising a series of holders mounted to slide on the respective hooks and each provided with an embracing portion shaped to receive and embrace the hook end of the hook when rocked into upright position.

47. In a loom, weaving mechanism for weaving a pile fabric, including reciprocating hooks to move the pile yarn between the warp threads, and locking mechanism for holding the pile yarns clamped fast in the hooks, comprising a slide frame, and means for sliding said frame rearward with relation to the hooks into locking position and forward with relation to the hooks into unlocking position.

48. In a loom, weaving mechanism for weaving a pile fabric, including reciprocating hooks, and locking mechanism for holding the pile yarns clamped fast in the hooks, comprising a slide frame, means for sliding said frame rearward with relation to the hooks into locking position and forward with relation to the hooks into unlocking position, and a spring detent for retaining said slide frame in its said two positions.

49. In a loom, mechanism for weaving a pile fabric, including reciprocating hooks, and locking mechanism for locking said hooks, comprising a slide frame, rocking means for shifting said slide frame movable therewith, and a longitudinally sliding rock shaft having a lug adapted to be rocked into inoperative position and into operative position, and means to slide said shaft when in the latter position into engagement with said rocking means for shifting said slide frame.

In testimony whereof, I have signed my name to this specification, in the presence of two subscribing witnesses.

THOMAS P. WALSH.

Witnesses:
CLYDE L. ROGERS,
PHINEAS KEITH.